July 22, 1941.    A. WARMISHAM    2,250,337
OPTICAL OBJECTIVE
Filed Dec. 14, 1939
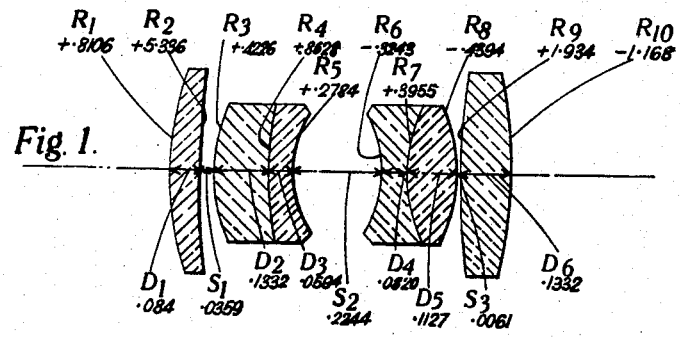
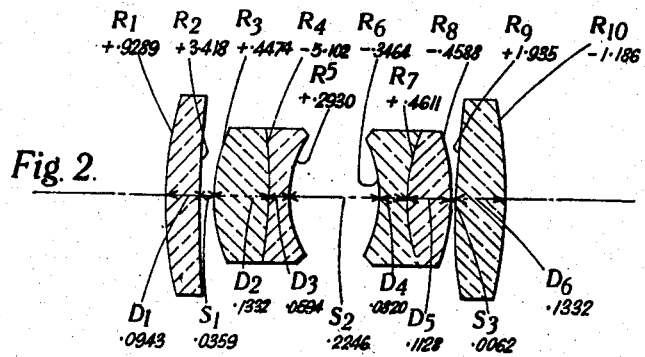
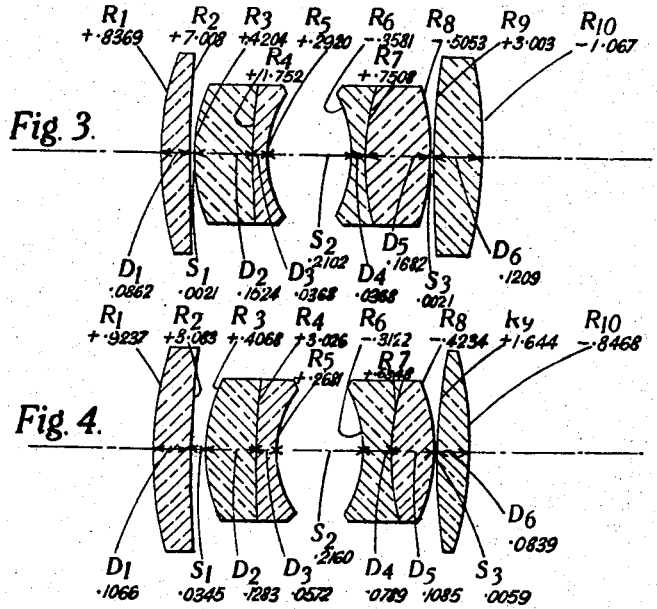
Inventor
A. WARMISHAM
by Blair & Kilcoyne
Attorney

UNITED STATES PATENT OFFICE 2,250,337

OPTICAL OBJECTIVE

Arthur Warmisham, Leicester, England, assignor to Taylor, Taylor & Hobson Limited, Leicester, England, a company of Great Britain Application December 14, 1939, Serial No. 309,266
In Great Britain December 23, 1938

5 Claims. (Cl. 88—57)

This invention relates to optical objectives for photographic or projection or like purposes, corrected for spherical and chromatic aberrations and for coma, astigmatism, distortion and curvature of field, and comprising four axially aligned components separated by air gaps, the two inner components consisting of compound dispersive meniscus components, with their concave surfaces facing one another, whilst the two outer components consist of simple collective elements.

The invention has for its primary object to secure improved zonal spherical aberration correction or to reduce the higher order overcorrected spherical aberration in such an objective, and thereby to obtain in comparison with known objectives of this kind either a higher aperture with generally the same degree of correction or considerably improved correction at the usual apertures.

In the objective according to the present invention one or each of the outer collective components is made of a glass having a mean refractive index higher than 1.75 and preferably higher than 1.8. Various examples of glass having such high refractive index are given in British Patent Specification No. 462,304, such glass having as its main constituents oxides of elements such as tungsten, tantalum, lanthalum, thorium, yttrium, zirconium, hafnium and colombium.

The sum of the numerical values of the curvatures of the front surface of the front dispersive component and the rear surface of the rear dispersive component conveniently lies between 4.25 and 4.85 times the reciprocal of the equivalent focal length of the objective.

When the relative aperture is not less than F/1.5, the sum of the numerical values of the curvatures of the front and rear surfaces of the rear collective component should preferably be less than 1.6 times the reciprocal of the equivalent focal length of the objective.

It is to be understood that the term "front" as herein used refers to the side of the objective nearer to the longer conjugate and the term "rear" to that nearer the shorter conjugate.

Four convenient practical examples of objective according to the invention are illustrated respectively in the four figures of the accompanying drawing and numerical data therefor are given in the following tables, in which the radii of curvature of the individual surfaces are designated by $R_1$ $R_2$ ... counting from the front, the positive sign indicating that the surface is convex towards the front and the negative sign that it is concave thereto, whilst the thicknesses of the individual elements along the axis are designated by $D_1$ $D_2$ ..., and the axial air spaces between the various components by $S_1$ $S_2$ $S_3$. The tables also give the mean refractive indices and the Abbé V numbers of the glasses used for the individual elements.

*Example I*

| Equivalent focal length 1.000 | | Relative aperture F/2 | |
|---|---|---|---|
| Radius | Thickness or separation | Refractive index $n_D$ | Abbé V number |
| $R_1=+.8106$ | $D_1=.084$ | 1.6130 | 59.3 |
| $R_2=+5.336$ | $S_1=.0359$ | | |
| $R_3=+.4223$ | $D_2=.1332$ | 1.6130 | 59.3 |
| $R_4=+.8628$ | $D_3=.0594$ | 1.6130 | 37.4 |
| $R_5=+.2784$ | $S_2=.2244$ | | |
| $R_6=-.3243$ | $D_4=.0820$ | 1.6446 | 33.5 |
| $R_7=+.3955$ | $D_5=.1127$ | 1.6441 | 48.3 |
| $R_8=-.4394$ | $S_3=.0061$ | | |
| $R_9=+1.934$ | $D_6=.1332$ | 1.8040 | 42.4 |
| $R_{10}=-1.168$ | | | |

Example II

| Equivalent focal length 1.000 | | Relative aperture F/1.5 | |
|---|---|---|---|
| Radius | Thickness or separation | Refractive index $n_D$ | Abbé V number |
| $R_1 = +.9289$ | | | |
| | $D_1 = .0943$ | 1.804 | 42.4 |
| $R_2 = +3.418$ | | | |
| | $S_1 = .0359$ | | |
| $R_3 = +.4474$ | | | |
| | $D_2 = .1332$ | 1.613 | 59.3 |
| $R_4 = -5.102$ | | | |
| | $D_3 = .0594$ | 1.613 | 37.4 |
| $R_5 = +.2930$ | | | |
| | $S_2 = .2246$ | | |
| $R_6 = -.3464$ | | | |
| | $D_4 = .0820$ | 1.6446 | 33.5 |
| $R_7 = +.4611$ | | | |
| | $D_5 = .1128$ | 1.6441 | 48.3 |
| $R_8 = -.4588$ | | | |
| | $S_3 = .0062$ | | |
| $R_9 = +1.935$ | | | |
| | $D_6 = .1332$ | 1.804 | 42.4 |
| $R_{10} = -1.186$ | | | |

Example III

| Equivalent focal length 1.000 | | Relative aperture F/1.4 | |
|---|---|---|---|
| Radius | Thickness or separation | Refractive index $n_D$ | Abbé V number |
| $R_1 = +.8369$ | | | |
| | $D_1 = .0862$ | 1.613 | 59.4 |
| $R_2 = +7.008$ | | | |
| | $S_1 = .0021$ | | |
| $R_3 = +.4204$ | | | |
| | $D_2 = .1524$ | 1.613 | 59.4 |
| $R_4 = +1.752$ | | | |
| | $D_3 = .0368$ | 1.621 | 36.1 |
| $R_5 = +.2920$ | | | |
| | $S_2 = .2102$ | | |
| $R_6 = -.3581$ | | | |
| | $D_4 = .0368$ | 1.6457 | 33.9 |
| $R_7 = +.7508$ | | | |
| | $D_5 = .1682$ | 1.644 | 48.3 |
| $R_8 = -.5053$ | | | |
| | $S_3 = .0021$ | | |
| $R_9 = +3.003$ | | | |
| | $D_6 = .1209$ | 1.850 | 42.0 |
| $R_{10} = -1.067$ | | | |

Example IV

| Equivalent focal length 1.000 | | Relative aperture F/2 | |
|---|---|---|---|
| Radius | Thickness or separation | Refractive index $n_D$ | Abbé V number |
| $R_1 = +.9237$ | | | |
| | $D_1 = .1066$ | 1.850 | 42.0 |
| $R_2 = +3.083$ | | | |
| | $S_1 = .0345$ | | |
| $R_3 = +.4068$ | | | |
| | $D_2 = .1283$ | 1.613 | 59.3 |
| $R_4 = +3.026$ | | | |
| | $D_3 = .0572$ | 1.613 | 37.4 |
| $R_5 = +.2681$ | | | |
| | $S_2 = .2160$ | | |
| $R_6 = -.3122$ | | | |
| | $D_4 = .0789$ | 1.644 | 33.5 |
| $R_7 = +.6348$ | | | |
| | $D_5 = .1085$ | 1.644 | 48.3 |
| $R_8 = -.4234$ | | | |
| | $S_3 = .0059$ | | |
| $R_9 = +1.644$ | | | |
| | $D_6 = .0839$ | 1.613 | 59.3 |
| $R_{10} = -.8468$ | | | |

It will be noticed that the high index glass is employed in Examples I and III for the rear component alone, in Example IV for the front component alone, and in Example II for both front and rear components. The sum of the numerical values of the curvatures of the third and eighth surfaces is in Example I 4.64, in Example II 4.41, in Example III 4.36, and in Example IV 4.82. The sum of the numerical values of the curvatures of the two surfaces of the rear component is in Example I 1.373, in Example II 1.395, in Example III 1.335, and in Example IV 1.789.

All four examples show good zonal spherical aberration correction, the first two being almost perfectly corrected in this respect. Thus the maximum departure from paraxial focus in Example I is only .08%, and in Example II .14%, whilst in Example III, although greater than in Examples I and II, it is still only .50% and in Example IV it is .40%. All the examples also maintain the good correction for the other aberrations which is characteristic of well-designed objectives of the kind to which the invention relates.

What I claim as my invention and desire to secure by Letters Patent is:

1. An optical objective corrected for spherical and chromatic aberrations, coma, astigmatism, distortion and curvature of field, comprising four axially aligned lens components separated by air gaps, of which the two outer components consist of simple collective elements at least one of which is made of a glass having a mean refractive index higher than 1.75, and the two inner components consist of compound dispersive meniscus components with their concave surfaces facing one another whilst the sum of the numerical values of the curvatures of their convex surfaces lies between 4.25 and 4.85 times the reciprocal of the equivalent focal length of the objective.

2. An optical objective corrected for spherical and chromatic aberrations, coma, astigmatism, distortion and curvature of field, having a relative aperture not less than F/1.5 and comprising four axially aligned lens components separated by air gaps, of which the two inner components consist of compound dispersive meniscus components with their concave surfaces facing one another whilst the sum of the numerical values of the curvatures of their convex surfaces lies between 4.25 and 4.85 times the reciprocal of the equivalent focal length of the objective, and the two outer components consist of simple collective elements at least one of which is made of a glass having a mean refractive index higher than 1.8, the sum of the numerical values of the curvatures of the front and rear surfaces of the rear component being less than 1.6 times the reciprocal of the equivalent focal length of the objective.

3. An optical objective having numerical data as set forth in the following table:

Example I

| Equivalent focal length 1.000 | | Relative aperture F/2 | |
|---|---|---|---|
| Radius | Thickness or separation | Refractive index $n_D$ | Abbé V number |
| $R_1 = +.8106$ | | | |
| | $D_1 = .084$ | 1.6130 | 59.3 |
| $R_2 = +5.336$ | | | |
| | $S_1 = .0359$ | | |
| $R_3 = +.4226$ | | | |
| | $D_2 = .1332$ | 1.6130 | 59.3 |
| $R_4 = +.8628$ | | | |
| | $D_3 = .0594$ | 1.6130 | 37.4 |
| $R_5 = +.2784$ | | | |
| | $S_2 = .2244$ | | |
| $R_6 = -.3243$ | | | |
| | $D_4 = .0820$ | 1.6446 | 33.5 |
| $R_7 = +.3955$ | | | |
| | $D_5 = .1127$ | 1.6441 | 48.3 |
| $R_8 = -.4304$ | | | |
| | $S_3 = .0061$ | | |
| $R_9 = +1.934$ | | | |
| | $D_6 = .1332$ | 1.8040 | 42.4 |
| $R_{10} = -1.168$ | | | |

4. An optical objective having numerical data as set forth in the following table:

*Example II*

| Equivalent focal length 1.000 | | Relative aperture F/1.5 | |
| --- | --- | --- | --- |
| Radius | Thickness or separation | Refractive index $n_D$ | Abbé V number |
| $R_1=+.9289$ | | | |
| | $D_1=.0043$ | 1.804 | 42.4 |
| $R_2=+3.418$ | | | |
| | $S_1=.0359$ | | |
| $R_3=+.4474$ | | | |
| | $D_2=.1332$ | 1.613 | 59.3 |
| $R_4=-5.102$ | | | |
| | $D_3=.0594$ | 1.613 | 37.4 |
| $R_5=+.2930$ | | | |
| | $S_2=.2246$ | | |
| $R_6=-.3464$ | | | |
| | $D_4=.0820$ | 1.6446 | 33.5 |
| $R_7=+.4611$ | | | |
| | $D_5=.1128$ | 1.6441 | 48.3 |
| $R_8=-.4588$ | | | |
| | $S_3=.0062$ | | |
| $R_9=+1.935$ | | | |
| | $D_6=.1332$ | 1.804 | 42.4 |
| $R_{10}=-1.186$ | | | |

5. An optical objective having numerical data as set forth in the following table:

*Example III*

| Equivalent focal length 1.000 | | Relative aperture F/1.4 | |
| --- | --- | --- | --- |
| Radius | Thickness or separation | Refractive index $n_D$ | Abbé V number |
| $R_1=+.8369$ | | | |
| | $D_1=.0862$ | 1.613 | 59.4 |
| $R_2=+7.008$ | | | |
| | $S_1=.0021$ | | |
| $R_3=+.4204$ | | | |
| | $D_2=.1524$ | 1.613 | 59.4 |
| $R_4=+1.752$ | | | |
| | $D_3=.0368$ | 1.621 | 36.1 |
| $R_5=+.2920$ | | | |
| | $S_2=.2102$ | | |
| $R_6=-.3581$ | | | |
| | $D_4=.0368$ | 1.6457 | 33.9 |
| $R_7=+.7508$ | | | |
| | $D_5=.1682$ | 1.644 | 48.3 |
| $R_8=-.5053$ | | | |
| | $S_3=.0021$ | | |
| $R_9=+3.003$ | | | |
| | $D_6=.1209$ | 1.850 | 42.0 |
| $R_{10}=-1.067$ | | | |

ARTHUR WARMISHAM.